June 16, 1964    S. M. KLINE    3,137,747
VACUUM FORMING
Filed Sept. 11, 1961
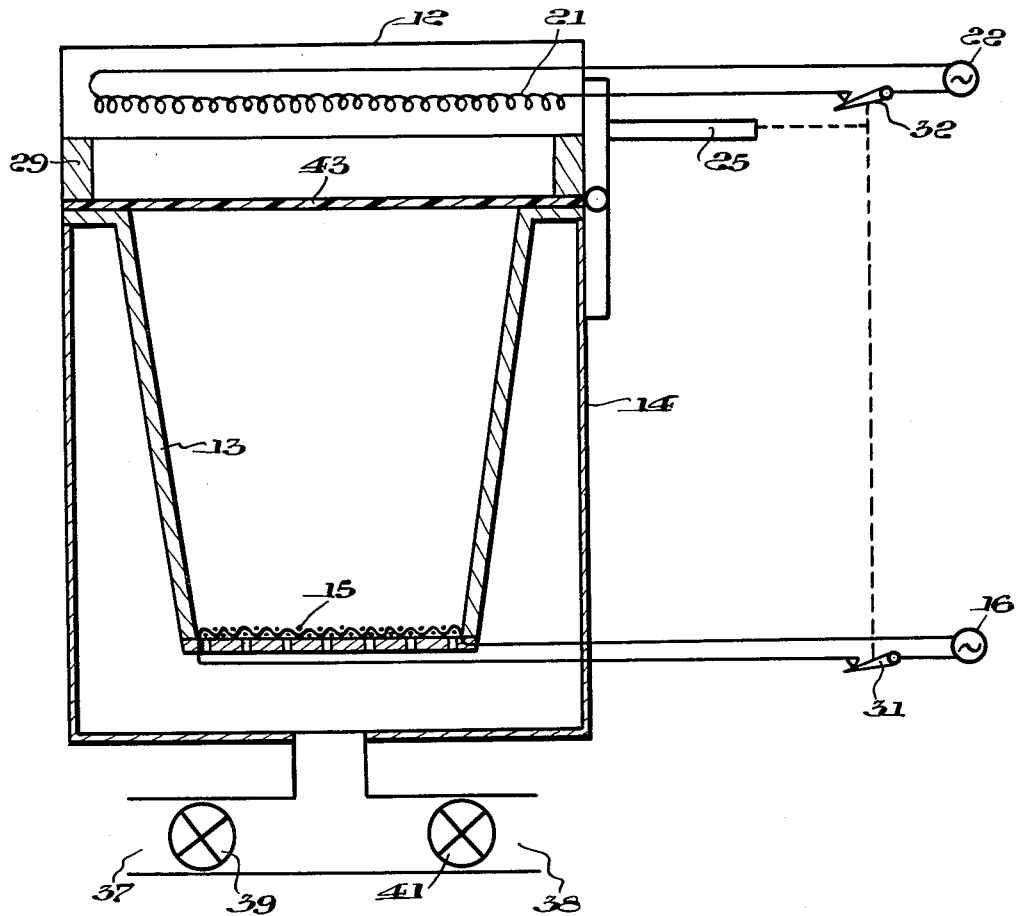
INVENTOR.
SAMUEL M. KLINE.
BY Oscar B. Brumback
his ATTORNEY.

3,137,747
VACUUM FORMING
Samuel M. Kline, Monaca, Pa., assignor to Koppers Company, Inc., a corporation of Delaware
Filed Sept. 11, 1961, Ser. No. 137,261
1 Claim. (Cl. 264—92)

This invention relates generally to the production of containers, and more particularly, to the production of containers from foamed polystyrene.

Containers which have a structure of foamed polymeric material possess the great advantages of lightness in weight and of high thermal insulation. Thus the container may hold cool contents and may be held in the hands without the heat of the body warming the articles. Conversely, the container may hold hot contents and may be held in the hands without burning the hands. Such containers have been made heretofore by the fusion of particles of expandable polystyrene. This invention contemplates a novel process for producing articles such as containers from sheets of foamed polystyrene by vacuum forming.

A great advantage of the invention is that vacuum forming generally is the least expensive method of producing materials because the mold can be made of lightweight construction as it has to withstand only atmospheric pressure. The auxiliary equipment can be simple, being only a heater, clamping device, and a vacuum pump with reservoir and valve.

Sheets of foamed polystyrene are commercially available. The sheets of foamed polystyrene may be extruded in accordance with copending application Serial No. 780,934, now abandoned, and from the compositions described in Patent Nos. 2,941,964 and 2,941,965.

The above and further objects and novel features of this invention will appear more fully from the detailed description when the same is read in conjunction with the accompanying drawing. It is to be expressly understood, however, that the drawing is not intended to be a definition of invention but is for the purpose of illustration only.

The single sheet af drawing illustrates partially in cross section and partially schematically an embodiment of a novel mold of the invention.

Turning now to the drawing, a female mold 13 of cup shape is mounted in a conventional vacuum mold box 14. The base portion of mold 13 includes a Nichrome wire screen 15 connected to a suitable power source 16. The hinge top 12 of the molding box includes a conventional radiant heater 21 connected to a suitable power source 22 and an articulating mechanism denoted 25 for opening or closing the material clamp 29 which extends around box 14 and for throwing the switches 31 and 32 for the heaters. At the bottom of the molding box 14 are vacuum lines 37 and 38 for applying a vacuum on the mold box. Conventionally, this vacuum valve 39 will provide a low value of vacuum and valve 41 a high value of vacuum.

In operating the mold, a sheet 43 of foamed polystyrene is placed over the mold 13. The clamp 29 is closed bringing the top radiant heater into position as shown in the drawing and applying power to the radiant heater above the sheet and, at the same time, applying power to the Nichrome screen base 15 of the mold 13, thereby causing the heater to emit radiant heat. Valve 39 is opened so that a vacuum of low order is drawn through vacuum line 37. Radiant heat from heater 21 warms sheet 43, whereupon the sheet becomes limp and sags into the mold. The center portion of sheet 43 softens and sags into the mold due to the linear expansion of the sheet when heated. The low order vacuum from line 37 begins to slowly draw the warm material into the mold. As it moves into the mold, it will tend to absorb progressively less heat from the top heater. The Nichrome heater at the base of the mold serves to keep the material temperature at the center of the sheet high enough to give a satisfactory draw into the mold. The sheet will tear at the edges of the mold if the center portion is too cold because the colder material will not elongate and will cause the material at the edges of the mold to be drawn beyond its elongation limits. The surrounding area progressing from the center of the material, however, is subjected to heat somewhat longer, permitting it to be uniformly softened. In the conventional vacuum forming apparatus, the material adjacent the clamping device does not heat as uniformly or as rapidly as material most removed from the clamping mechanism.

In this invention, as sheet material 43 is drawn into mold 13, switches 31 and 32 are opened to de-energize heaters 15 and 21, and valve 39 closed and valve 41 opened to place a relatively high vacuum on mold box 14, thereupon drawing the material to the mold configuration. The nichrome wire screen 15 at the bottom of the mold tends to lose its heat rapidly because of this low mass per unit area.

The foregoing has presented a novel method for the vacuum forming of a container, such as a cup, from a sheet of foamed polystyrene and provides a more uniform wall formation for the finished article. It will be obvious that while the foregoing has described operations that are carried out manually, the same may be carried out automatically when the mold box 14 is a portion of an automatic molding machine.

It is claimed:

A method for forming a receptacle from a sheet of foamed polystyrene comprising clamping a sheet of foamed polystyrene above a cup-shaped female mold, applying radiant heat from a first fixedly position source to the upper portion of said sheet, applying radiant heat from a second fixedly position source to the lower portion of said sheet, whereby said sheet becomes warm, and subjecting said sheet to a slight vacuum at the same time that heat is applied to the upper portion and the lower portion of said sheet so as to draw said sheet into the mold, whereby the upper and lower portions become differentially heated in that the upper portion of the sheet receives less heat as the upper portion moves away from said first heat source and the lower portion of the sheet receives more heat as the lower portion approaches said second heat source, and thereafter discontinuing said heating and subjecting said sheet to a greater vacuum whereby said sheet is made to conform to the shape of said mold.

References Cited in the file of this patent
UNITED STATES PATENTS

| | | |
|---|---|---|
| 2,377,946 | Leary | June 12, 1945 |
| 2,531,539 | Smith | Nov. 28, 1950 |
| 2,550,836 | MacHenry | May 1, 1951 |
| 2,660,761 | Peters | Dec. 1, 1953 |
| 2,760,233 | Bjorksten | Aug. 28, 1956 |
| 2,942,301 | Price et al. | June 28, 1960 |